United States Patent [19]

Swanson

[11] Patent Number: 4,749,299
[45] Date of Patent: Jun. 7, 1988

[54] UNITARY COMPRESSION MEMBER AND WEAR INDICATOR FOR A BALL JOINT

[75] Inventor: Carl H. Swanson, Oklahoma City, Okla.

[73] Assignee: Dana Corporation, Toledo, Ohio

[21] Appl. No.: 54,346

[22] Filed: May 26, 1987

[51] Int. Cl.⁴ ............................................. F16C 11/06
[52] U.S. Cl. ...................................... 403/27; 403/132; 403/138; 16/208
[58] Field of Search ................. 403/27, 132, 133, 138; 16/208

[56] References Cited

U.S. PATENT DOCUMENTS

| | | | |
|---|---|---|---|
| 3,791,748 | 2/1974 | Goodrich, Jr. et al. | 403/27 |
| 3,813,178 | 5/1974 | Herbenar et al. | 403/27 |
| 3,820,907 | 6/1974 | Hassan | 403/27 |
| 3,845,735 | 11/1974 | Bossler, Jr. | 116/114 Q |
| 3,850,443 | 11/1974 | Hassan | 280/96.2 R |
| 3,890,052 | 6/1975 | Herbenar et al. | 403/138 X |
| 3,945,737 | 3/1976 | Herbenar | 403/27 |
| 3,960,457 | 6/1976 | Gaines et al. | 403/27 |
| 3,999,870 | 12/1976 | Clark et al. | 403/36 |
| 4,017,197 | 4/1977 | Farrant | 403/27 |
| 4,070,121 | 1/1978 | Graham | 403/27 |
| 4,101,227 | 7/1978 | Herbenar et al. | 403/27 |
| 4,111,571 | 9/1978 | Farrant | 403/27 |
| 4,358,211 | 11/1982 | Goodrich, Jr. et al. | 403/27 |
| 4,576,499 | 3/1986 | Smith | 403/27 |
| 4,626,121 | 12/1986 | Tajima et al. | 403/27 |

Primary Examiner—Andrew V. Kundrat
Attorney, Agent, or Firm—MacMillan, Sobanski & Todd

[57] ABSTRACT

A resilient compression member for a ball joint which has a wear indicating mechanism formed integrally therewith is disclosed. The compression member preloads a ball unit of the joint within a socket-like housing. The compression member includes an indicator pin formed integrally therewith. The indicator pin is disposed within an annular recess extending partially through the body of the compression member. The indicator pin is attached to the body of the compression member by means of a relatively thin membrane-like web portion. The end of the indicator pin extends outwardly from the compression member recess and the housing of the joint by a predetermined distance. As wear occurs within the joint, the exposed end of the indicator pin is moved relative to the housing of the joint. Accordingly, a visual indication of the amount of wear within the joint is provided from outside the joint.

6 Claims, 1 Drawing Sheet

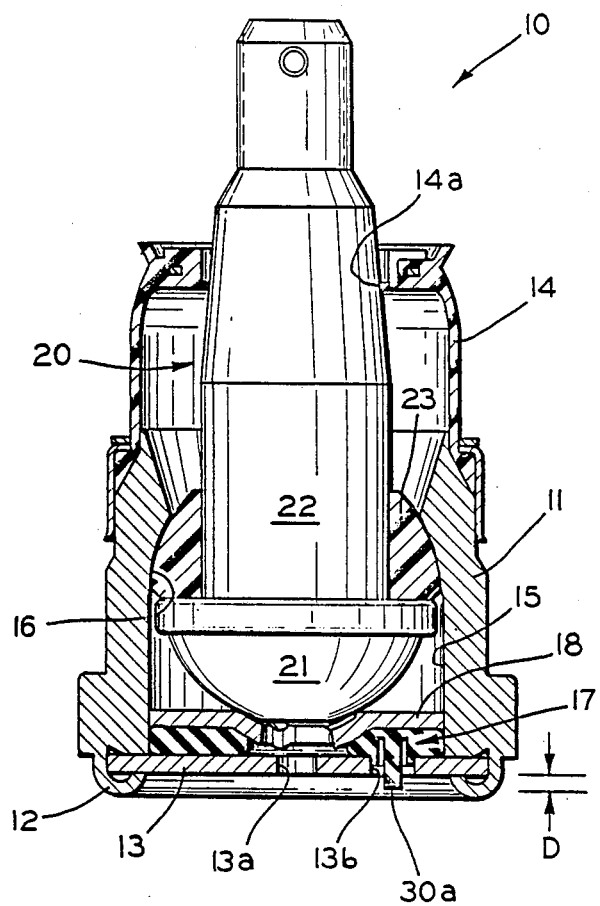
FIG. 1
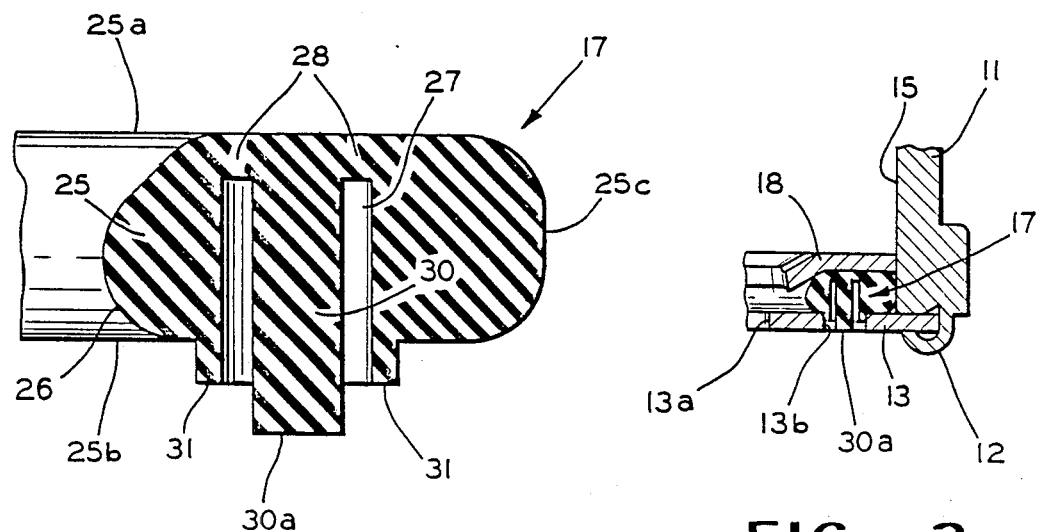
FIG. 2
FIG. 3

UNITARY COMPRESSION MEMBER AND WEAR INDICATOR FOR A BALL JOINT

BACKGROUND OF THE INVENTION

The present invention relates in general to ball joints for vehicles and in particular to a resilient compression member for such a ball joint which has a wear indicating mechanism formed integrally therewith.

Ball and socket type joints are well known mechanical devices which are frequently utilized in vehicle suspension and steering systems. Such joints are normally provided with an internal resilient mechanism, which generates preloading forces against selective components of the joint. The preloading forces urge and maintain those selected components in contact with the ball portion of the joint. As the components of the joint wear, vehicle springs external to the joint (which are typically connected to the ball portion thereof) generally prevent the ball and socket portions of the joint from developing a loose fit or "play" therebetween. The resilient mechanism maintains the selected components of the joint in contact with the ball portion, despite the relative movement thereof resulting from such wear. After a certain amount of use, however, excessive wear in the ball joint cannot be compensated for by the vehicle springs, and the joint must be removed from vehicle for service. Accordingly, it is desirable to monitor the amount of wear which has occurred within the ball joint during use in order to determine when service is necessary.

Since wear occurs to the internal components of the ball joint, it is difficult to determine how much wear has occurred therein without disassembling the joint for visual inspection or without elevating the associated wheel of the vehicle for manual manipulation. Obviously, such disassembly is undesirable, because it requires the removal of the joint from the vehicle at a time when such removal may not be necessary. As a result, wear indicating mechanisms have been developed which provide an external indication of the amount of internal wear within the joint, thus obviating the need for removal of the joint for inspection or for elevation of the wheel for manipulation. Unfortunately, known wear indicating mechanisms require the use of a number of additional parts, thereby increasing the cost of materials and assembly of the joint. Also, known wear indicating mechanisms have been prone to permitting leakage of lubricant from the joint.

SUMMARY OF THE INVENTION

The present invention relates to a resilient compression member for a ball joint which has a wear indicating mechanism formed integrally therewith. The compression member preloads a ball unit of the joint within a socket-like housing. The compression member includes an indicator pin formed integrally therewith. The indicator pin is disposed within an annular recess extending partially through the body of the compression member. The indicator pin is attached to the body of the compression member by means of a relatively thin membrane-like web portion. The end of the indicator pin extends outwardly from the compression member recess and the housing of the joint by a predetermined distance. As wear occurs within the joint, the exposed end of the indicator pin is moved relative to the housing of the joint. Accordingly, a visual indication of the amount of wear within the joint is provided from outside the joint.

It is an object of the present invention to provide an improved ball joint having a wear indicating mechanism.

It is another object of the present invention to provide such a ball joint having a resilient compression member and a wear indicating means combined in a unitary elastomeric body.

Other objects and advantages of the present invention will become apparent to those skilled in the art from the following detailed description of the preferred embodiment, when read in light of the accompanying drawings.

BRIEF DESCRIPTION OF THE DRAWINGS

FIG. 1 is a sectional elevational view of a ball joint including a unitary resilient compression member and wear indicating mechanism in accordance with the present invention, the joint being illustrated in a non-worn condition.

FIG. 2 is an enlarged fragmentary sectional elevational view of the combined resilient compression member and wear indicating mechanism illustrated in FIG. 1.

FIG. 3 is a fragmentary sectional elevational view similar to FIG. 1, the ball joint being illustrated in a worn condition.

DETAILED DESCRIPTION OF THE PREFERRED EMBODIMENT

Referring now to the drawings, there is illustrated in FIG. 1 a ball joint, indicated generally at 10, in accordance with the present invention. The ball joint 10 includes a generally hollow cylindrical housing 11. The upper and lower ends of the housing 11 are opened, the lower end of the housing 11 having an annular flange 12 formed integrally therewith. The flange 12 is curled radially inwardly and upwardly, as shown in FIGS. 1 and 3, when the ball joint 10 is assembled. Such assembly of the ball joint 10 will be explained in detail below. A circular closure plate 13 is retained between the curled flange 12 and the lower end of the housing 11. The closure plate 13 includes a first aperture 13a which is aligned with longitudinal axes of the housing 11 and the closure plate 13, and a second aperture 13b, which is radially offset from the first aperture 13a. A flexible boot 14 is connected about the upper end of the housing 11. The upper end of the flexible boot 14 is closed, except for a central aperture 14a formed therethrough which is aligned with the longitudinal axis of the housing 11.

The inner surface of the hollow cylindrical housing 11 defines a socket-like internal cavity. Such inner surface includes a cylindrical portion 15 and a semi-spherical portion 16. As best shown in FIG. 1, the cylindrical inner surface portion 15 is disposed adjacent to the lower end of the housing 11, while semi-spherical inner surface portion 16 is disposed adjacent to the upper end of the housing 11. A generally toroidal elastomeric compression member, indicated generally at 17, is disposed in the lower end of the housing 11, adjacent to the closure plate 13. A wear plate 18 is also disposed in the lower end of the housing 11, adjacent to the compression member 17.

A ball unit, indicated generally at 20, cooperates with the housing 11 to form the ball joint 10. The ball unit 20 includes a generally semi-spherical head 21 having a cylindrical shank 22 extending therefrom. The head 21 is disposed within the cavity formed in the housing 11, adjacent to the wear plate 18. An annular bearing ring 23 is positioned about the shank 22 in abutment with head 21. The bearing ring 23 has a generally semi-spherical shape which is oriented in an opposite direction from the head 21 so as to form a generally spherical end portion for the ball unit 20. The bearing ring 23 is disposed within the cavity formed in the housing 11, adjacent to the semi-spherical inner surface portion 16.

To assemble the ball joint 10, the flange 12 of the housing 11 is initially formed to extend straight downwardly from the housing 11. The shank 22 of the ball unit 20 is then inserted upwardly through the opened lower end of the housing 11. As a result, the shank 22 is moved through the upper end of the housing 11 until the bearing ring 23 abuts the semi-spherical inner surface portion 16 of the housing 11. The wear plate 18, the compression member 17, and the closure plate 13 are then inserted in order within the cylindrical inner surface portion 15 of the housing 11. Next, the flange 12 of the housing 11 is curled radially inwardly and upwardly to the position illustrated in FIG. 1 so as to retain the above-described components within the housing 11. Thus, when the ball joint 10 is assembled, the semi-spherical bearing ring 23 engages the semi-spherical inner surface portion 16 of the inner cavity, while the semi-spherical head 21 of the shank 20 engages the wear plate 18. Lastly, the boot 14 is secured to the upper end of the housing 11 such that the shank 22 extends through the central aperture 14a.

Referring now to FIG. 2, the structure of the compression member 17 is illustrated in detail. As shown therein, the compression member 17 includes a toroidal shaped main body 25 having an upper end 25a and a lower end 25b. A curved outer peripheral surface 25c extends about the main body 25 between the upper and lower ends 25a and 25b. A central aperture 26 is formed co-axially through the body 25. An annular recess 27 is formed in the body 25, which extends upwardly from the lower end 25b thereof. The recess 27 extends only partially through the body 25, terminating at a relatively thin membrane-like web portion 28 disposed adjacent to the upper end 25a of the body 25. The recess 27 defines a generally cylindrical indicator pin 30, which is formed integrally with the compression member 17. Thus, the web portion 28 serves to connect the base of the indicator pin 30 to the main body 25 of the compression member 17.

A portion of the indicator pin 17 extends downwardly beyond the lower end 25b of the main body 25 of the compression member 17. That portion of the indicator pin 30 terminates in a flat circular lower surface 30a. A downwardly extending annular lip 31 is formed integrally with the lower end 25b of the main body 25. The lip 31 is disposed about the portion of the indicator pin 30 which extends downwardly from the lower end 25b. The lip 31 is adapted to be partially received within the second aperture 13b formed through the closure plate 13, as illustrated in FIGS. 1 and 3, so as to provide proper registration of the indicator pin 30 therein.

The compression member 17 is formed from any suitable elastomeric material, such as polyurethane or an alloy material formed from rubber and plastic. The dimensions of the various portions of the compression member 17 may vary according to the size of the ball joint 10. For example, the overall thickness of the main body 25 may vary from 0.280 inch to 0.450 inch. In most instances, however, the thickness of the web portion 28 is made as small as possible, for a purpose which will be discussed in detail below. It has been found that a thickness of 0.050 inch for the web portion 28 provides a secure connection between the indicator pin 30 and the body 25 so as to prevent accidental breakage and separation, yet is sufficiently small to achieve the purpose described below.

When the flange 12 is curled radially inwardly during assembly of the ball joint 10, as described above, the resilient compression member 17 is compressed between the closure plate 13 and the wear plate 18. As a result, a preloading force is exerted upwardly against the head 21 of the ball unit 20 by the wear plate 18. Since the bearing ring 23 is formed from a relatively non-compressible material, a similar preloading force is exerted downwardly by the semi-spherical inner surface portion 16 of the housing 11. Thus, the ball unit 20 is preloaded within the housing 11. However, the ball unit 20 is permitted to pivot within the housing 11, in a manner which is well known in the art. As a result of such compression, the thickness of the compression member 17 is reduced. However, the indicator pin 30 extends downwardly through the second aperture 13b of the closure plate 13, as shown in FIG. 1, and is not compressed. Accordingly, the lower end 30a of the indicator pin 30 is positioned at a predetermined distance, indicated in FIG. 1 as "D", below the lower end of the closure plate 13.

The thickness of the relatively thin membrane-like web portion 28 is made small in order to prevent expansion and contraction of the compression member 17 from causing corresponding expansion and contraction of the indicator pin 30. In other words, since most of the indicator pin 30 is separated from the main body 25 of the compression member 17 by the recess 27, the indicator pin 30 is essentially functionally disassociated from the compression member 17. Thus, compression of the compression member 17 does not cause any significant changes in the dimensions of the indicator pin 30. As a result, the distance from the upper end 25a of the compression member 17 to the lower end 30a of the indicator pin 30 is remains essentially constant regardless of the amount of compression of the compression member 17.

When the ball joint assembly 10 is assembled as described above, the upper end 25a of the compression member 17 is constantly maintained in abutment with the lower end of the wear plate 18. Because of the isolating connection provided by the web portion 28 described above, the lower end 30a of the indicator pin 30 is maintained at a predetermined spaced apart distance from the lower end of the wear plate 18. Thus, the position of the lower end 30a of the indicator pin 30 relative to the housing 11 (the distance "D") can be utilized to determine the position of the wear plate 18 within the housing 11. As shown in FIG. 1, the distance "D" represents the relative position of the indicator pin 30 when the ball joint 10 has not experienced wear. As the ball joint 10 is utilized, such wear occurs at the abutting surfaces of the semi-spherical inner surface 16 and the bearing ring 23, as well as the bearing ring 23 and the head 21 of the ball unit 20. Consequently, the dimensions of such components decrease. Because of the preloading forces generated by the compression member 17, the wear plate 18 is moved upwardly within the housing 11.

As the wear plate 18 is moved upwardly within the housing 11, the indicator pin 30 is also moved upwardly. Consequently, the lower end 30a of the indicator pin 30 is retracted within the housing 11, as illustrated in FIG. 3. The amount of wear of ball joint 10, therefore, can be readily determined by visual inspection of the position of the lower end 30a of the indicator pin relative to the closure plate 13. As can be seen from FIG. 3, the lower end 30a has receded to such an extent that it is substantially flush with the lower end of closure plate 13. The occurrence of such a situation indicates that the ball joint 10 is excessively worn and thus requires replacement.

In addition to providing an indication of the degree of wear of the ball joint 10, the main body 25 of the compression member 17 also provides a seal about the cylindrical inner surface 15 of the housing 11. As the compression member 17 is compressed during assembly of the ball joint 10 as described above, the outer peripheral surface 25c of the main body 25 expands radially outwardly, thereby sealingly engaging the cylindrical inner surface 15 of the housing 11. Also, the lower end 25b and the centering lip 31 provide a seal about the second aperture 13b formed in the closure plate. Thus, an effective seal is provided about the lower end of the housing 11 to retain the lubricant or grease within the housing 11.

In accordance with the provisions of the patent statutes, the principle and mode of operation of the present invention have been explained and illustrated in its preferred embodiment. However, it must be understood that the present invention may be practiced otherwise than as specifically explained and illustrated without departing from its spirit or scope.

What is claimed is:

1. A ball and socket type joint comprising:
   a hollow cylindrical housing defining an internal cavity;
   a ball unit including a head and a shank, said head being pivotally disposed within said internal cavity, said shank extending from the head;
   a wear plate disposed in said internal cavity having one end in abutment with said head of said ball unit;
   a closure plate secured to said housing on the opposite end of said wear plate, said closure plate having an aperture extending therethrough; and
   a compression member disposed between said wear plate and said closure plate, said compression member including a main body having an indicator pin formed integrally therewith, said indicator pin being defined by an annular recess extending partially through said main body, said indicator pin being attached to said main body by a relatively thin membrane-like web portion formed integrally with said main body and said indicator pin, said web portion being disposed adjacent to said wear plate, a lower end of said indicator pin extending through said aperture of said closure plate a predetermined distance to provide a visual indication from outside said joint of the degree of wear within said joint.

2. The invention defined in claim 1 wherein an outer peripheral surface of said main body contacts an inner surface of said housing to provide a seal therebetween.

3. The invention defined in claim 1 wherein said main body includes a lip extending about said recess formed in said main body, said lip providing registration of said recess and said pin within said aperture formed in said closure member.

4. The invention defined in claim 3 wherein an outer peripheral surface of said main body contacts an inner surface of said housing to provide a seal therebetween.

5. The invention defined in claim 4 wherein said indicator pin is radially offset from a longitudinal axis of said housing.

6. A compression member for biasing a ball unit toward a housing of a ball joint comprising a unitary elastomeric main body having an indicator pin disposed in a recess extending only partially through said main body, said indicator pin being attached to said main body by a relatively thin membrane-like web portion formed integrally with said main body and said indicator pin, said indicator pin including an end adapted to extend from said recess a predetermined distance to provide a visual indication from outside said joint of the amount of wear of the joint.

* * * * *